Aug. 12, 1941.  W. P. GALLAGHER ET AL  2,251,994
SELECTIVE GUM VENDING MACHINE
Filed Oct. 19, 1939   9 Sheets-Sheet 1
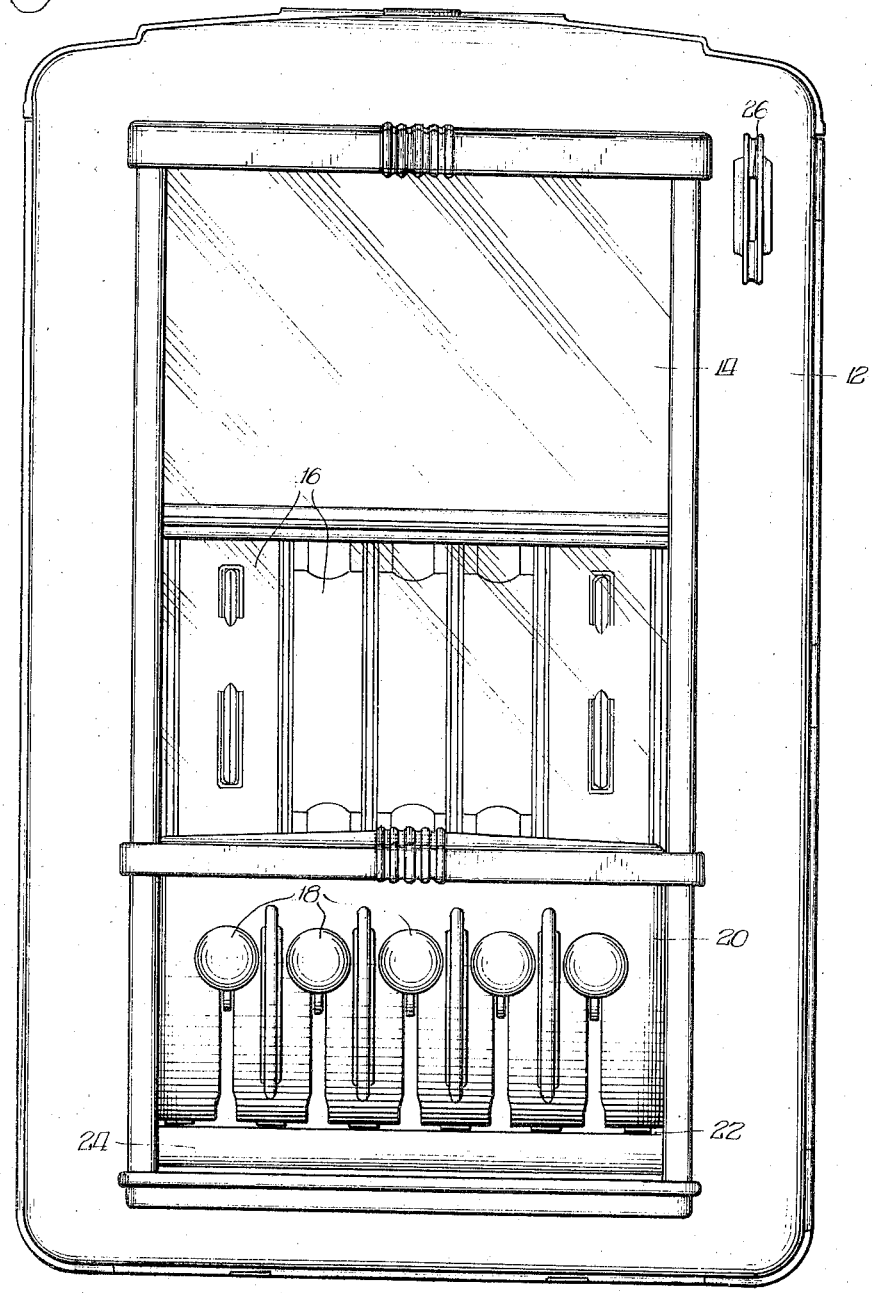

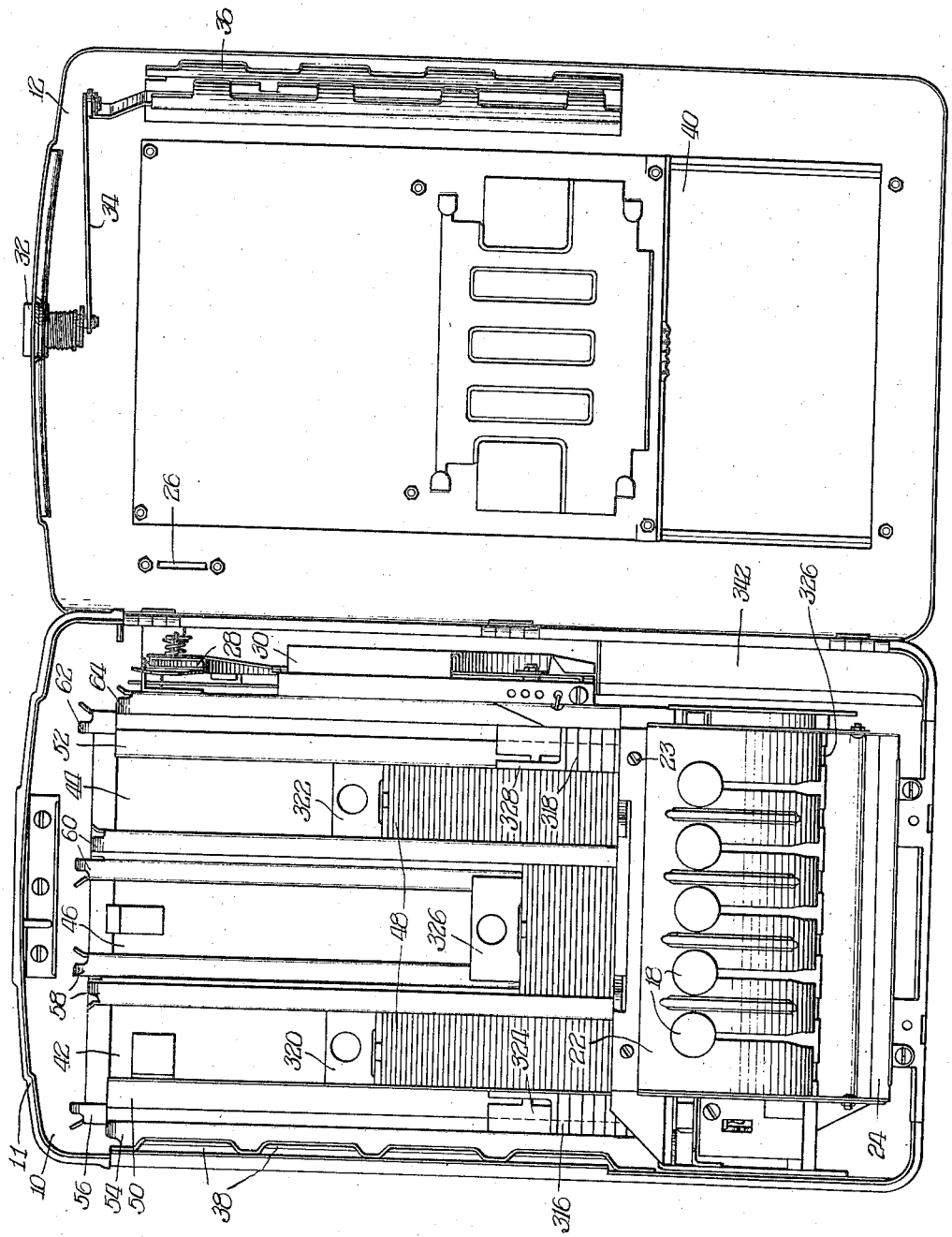

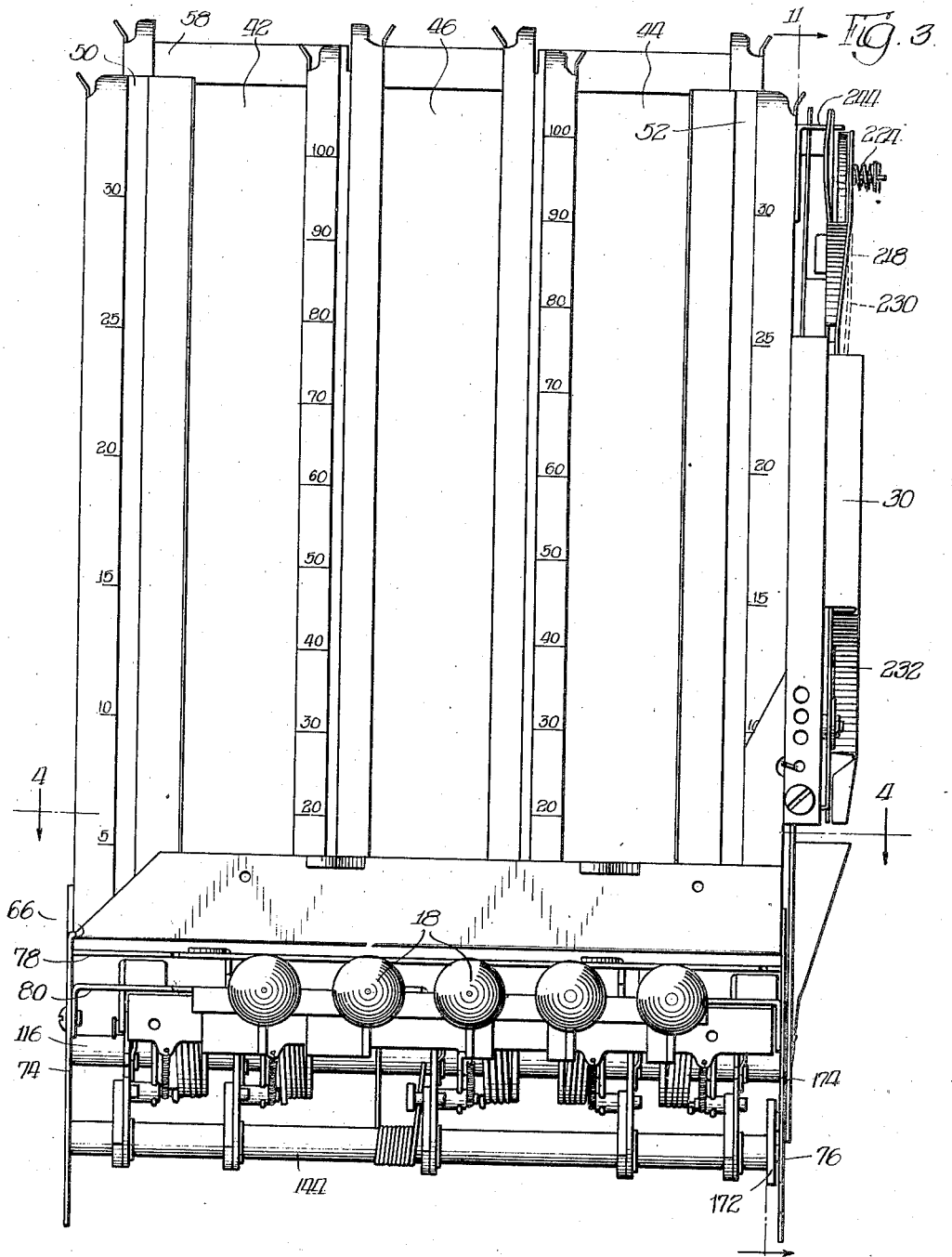

Aug. 12, 1941.   W. P. GALLAGHER ET AL   2,251,994
SELECTIVE GUM VENDING MACHINE
Filed Oct. 19, 1939   9 Sheets-Sheet 4
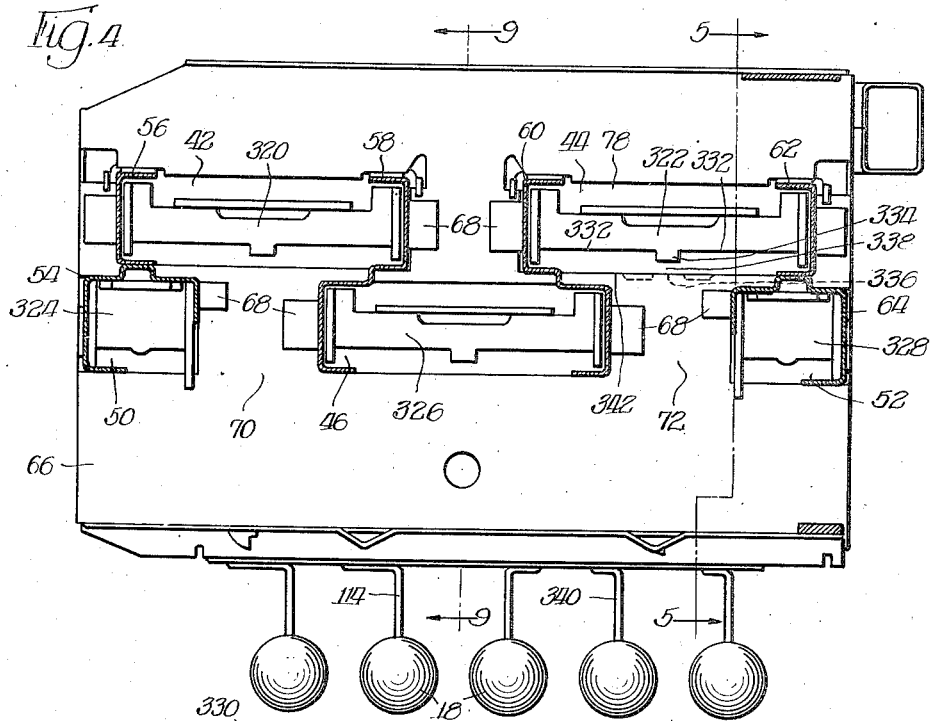
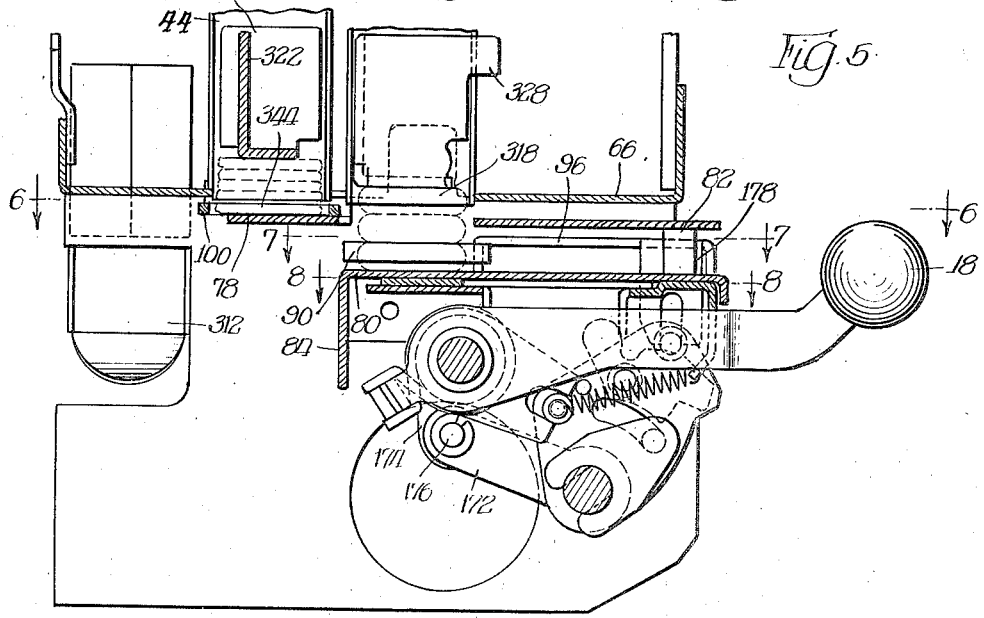
INVENTORS.
William P. Gallagher,
BY Ernest H. Thompson,
Richard Spencer
ATTORNEY.

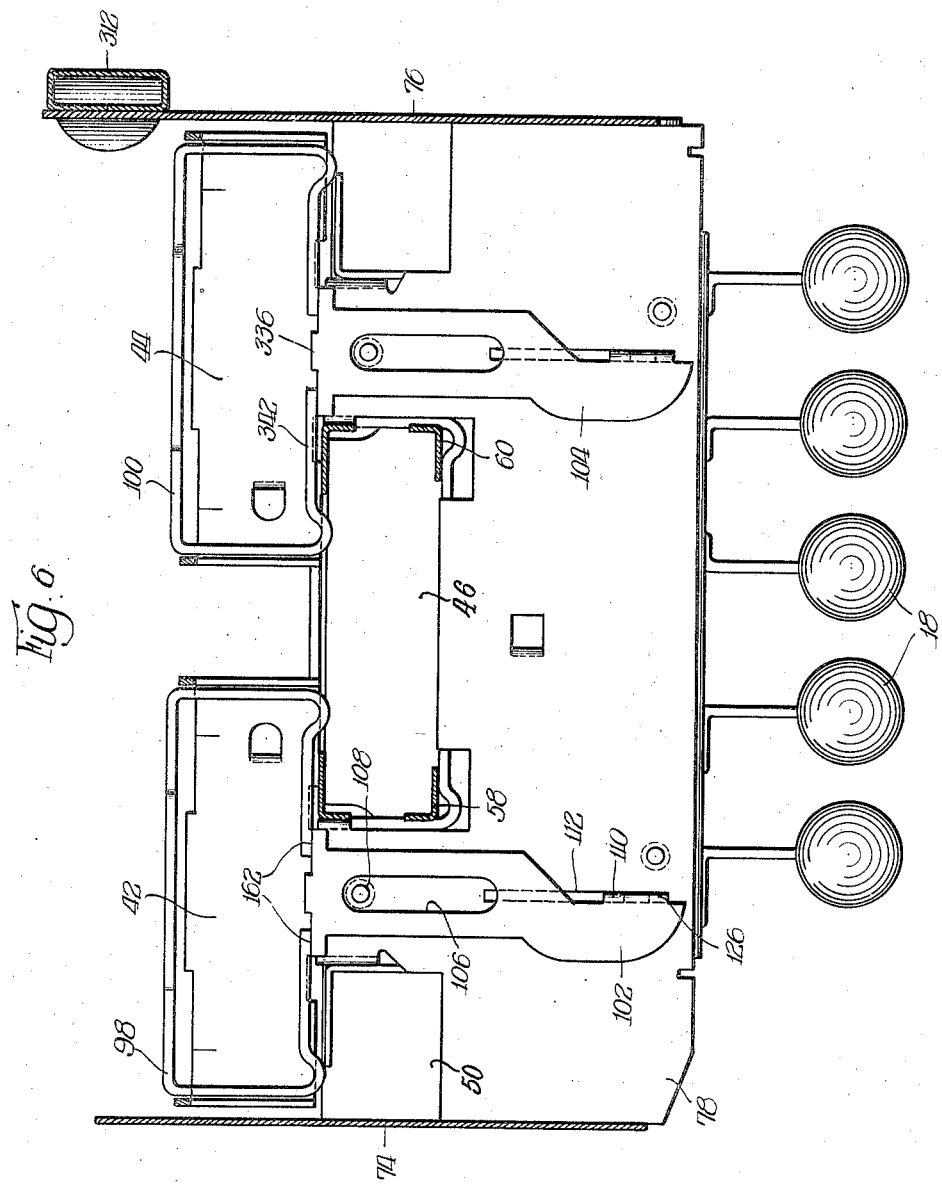

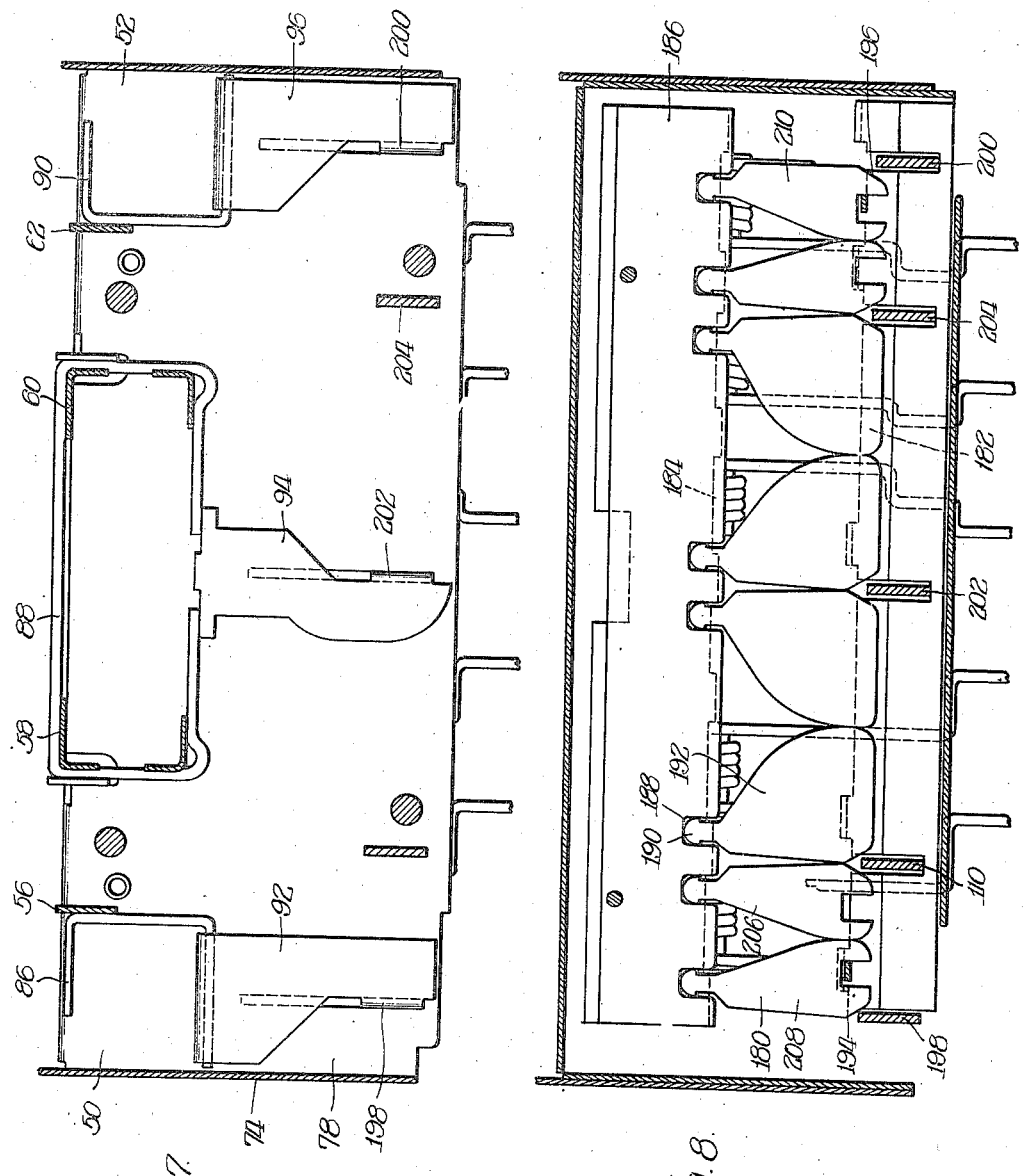

Aug. 12, 1941.  W. P. GALLAGHER ET AL  2,251,994
SELECTIVE GUM VENDING MACHINE
Filed Oct. 19, 1939  9 Sheets-Sheet 7
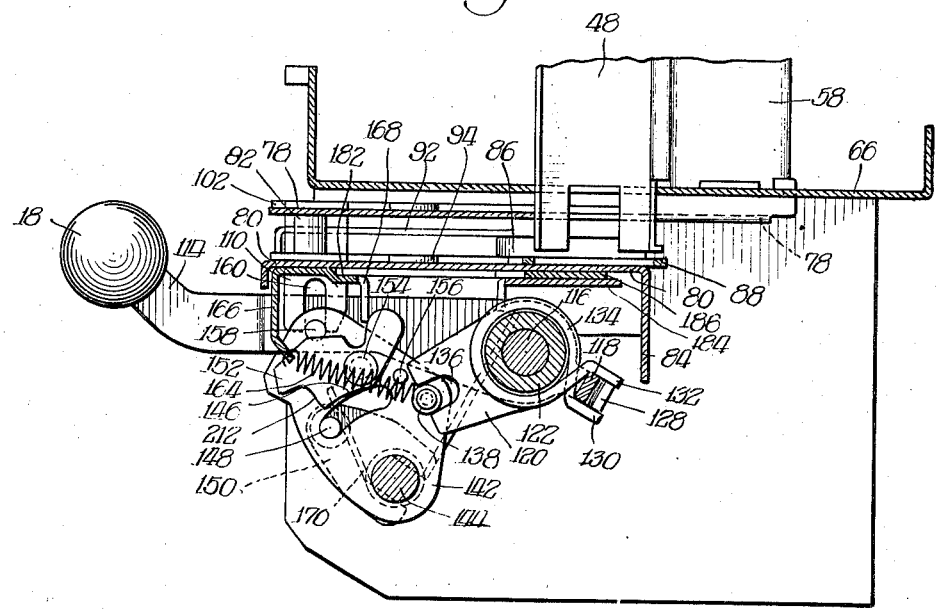
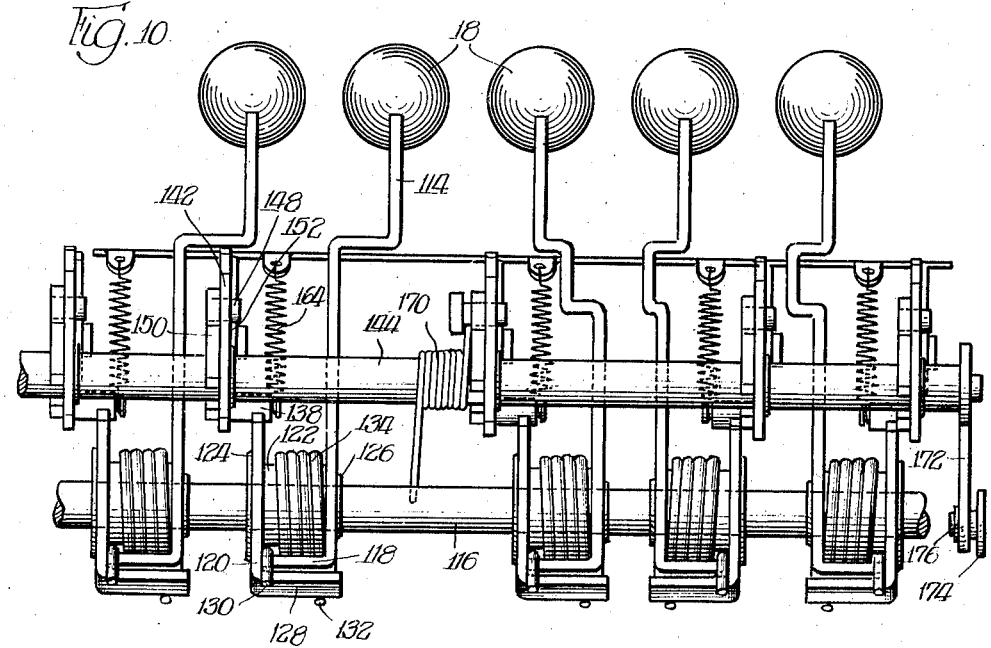

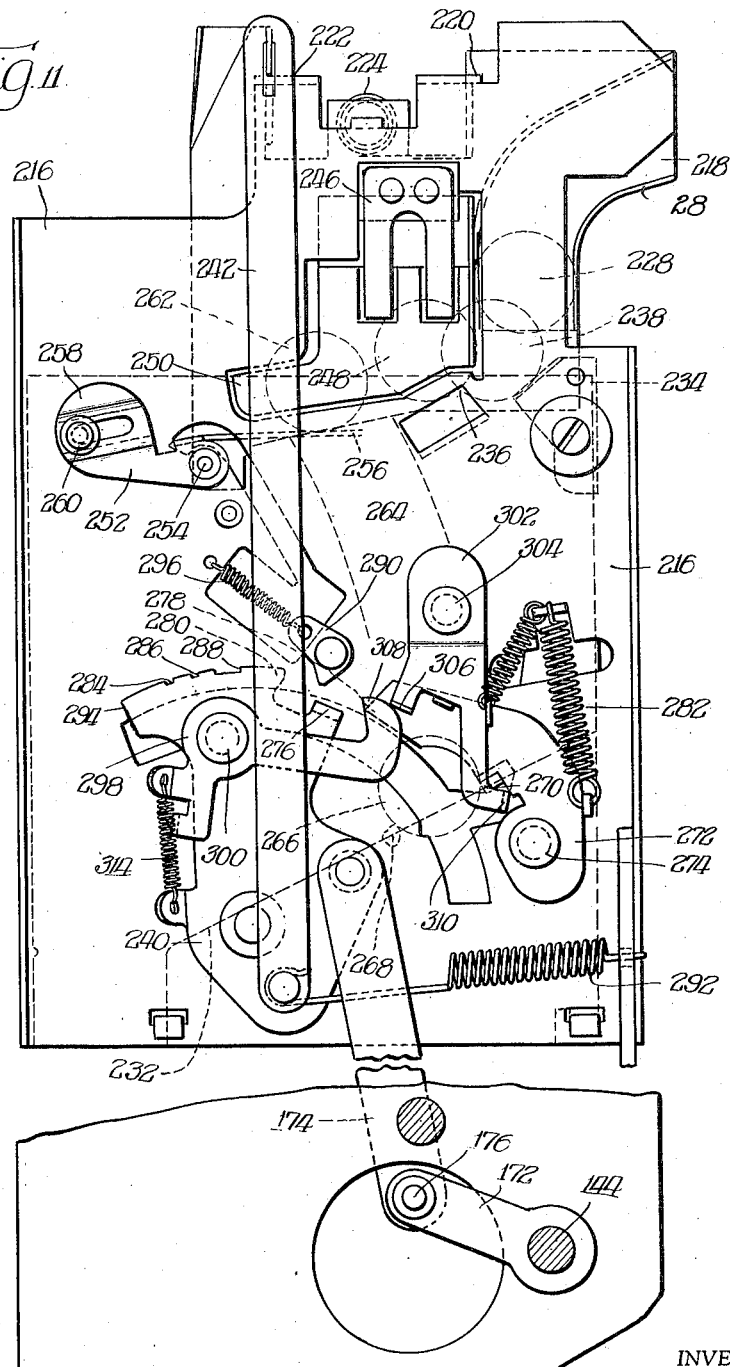

Aug. 12, 1941.  W. P. GALLAGHER ET AL  2,251,994
SELECTIVE GUM VENDING MACHINE
Filed Oct. 19, 1939   9 Sheets-Sheet 9

INVENTORS,
William P. Gallagher,
BY Ernest H. Thompson,
Richard Spencer
ATTORNEY Patented Aug. 12, 1941

2,251,994

UNITED STATES PATENT OFFICE 2,251,994

SELECTIVE GUM VENDING MACHINE

William P. Gallagher, Chicago, and Ernest H. Thompson, Winnetka, Ill., assignors to Automatic Canteen Company of America, Chicago, Ill., a corporation of Delaware Application October 19, 1939, Serial No. 300,120

13 Claims. (Cl. 312—67)

This invention relates to vending machines, and more particularly to that class of vending machines that employs a plurality of magazines for dispensing successively articles stored within the magazines. As illustrated herein, the invention is incorporated in a machine for selectively dispensing a number of different flavors of chewing gum, although it must be appreciated at the outset that many aspects of the invention are capable of being employed in connection with machines for dispensing articles other than chewing gum.

An object of the invention is to provide an arrangement of magazines in a machine of the character under discussion which will permit the use of a compact container, that is, one in which the width of the machine will be narrower than has been generally customary heretofore. Thus, the conventional machine of the prior art for dispensing packaged articles from a plurality of magazines has customarily had the magazines arranged in side-by-side relationship, with the result that the width of the machine is somewhat greater than the combined width of the aligned magazines. Of course, an arrangement of this type results in a cabinet having a broad front and a comparatively shallow depth, and frequently this is not desirable because of the considerable amount of space required for the machine. To repeat, therefore, an object of the instant invention is to arrange the magazines in a multiple magazine machine in such a manner as to decrease the linear relationship between the width of the cabinet and the depth thereof. A feature of the invention which contributes to the accomplishment of this object consists in dividing the magazines into groups and arranging these groups in rows or banks, with the magazines in one bank positioned in the rear or in front of the magazines in the adjoining bank. Thus, rather than have all of the magazines positioned in side-by-side relationship, some are located in the rear of others, thereby decreasing the required width of the container and at the same time increasing somewhat the depth thereof.

Machines embodying the feature just mentioned have not been widely developed for various reasons, including the necessity of overcoming an outstanding mechanical difficulty caused by interference between the dispensing devices provided for each magazine when the magazines are disposed in more than one row or bank which themselves are close together. In order that this mechanical difficulty may be clearly perceived, the type of dispensing device which is used in this invention and which is in common use for dispensing articles such as packaged gum should be in mind.

This device, which is used in conjunction with a vertically disposed magazine holding a stack of articles resting on a delivery deck, comprises a piece of metal of a thickness approximating that of an article to be dispensed resting upon the delivery deck and adapted to push one article from the bottom of the stack toward an edge of the delivery deck supporting the stack. When the article falls off the edge of the delivery deck it drops into a chute which carries the article to a point where the customer may remove it. It is apparent that in order for this type of dispensing device to complete a stroke it must be free to move an article to a point beyond the stack. And, it follows that no adjoining magazine or its dispensing device may be located in the space which will be occupied by an article or dispensing device during a delivery movement. For this reason a second row or bank of magazines must be spaced from the front row by approximately the length of the stroke of a dispensing device and this results in waste space between the rows of magazines and defeats the very end sought by employing more than one row of magazines.

The above mentioned difficulty in positioning banks of magazines one behind the other is principally encountered in those vending machines which use a dispensing device of the general type described above, and when it is remembered that this type of dispensing device is perhaps the simplest for dispensing any article from the bottom of a stack, the slowness in developing vending machines having multiple banks will be perceived. One of the features of this invention consists in providing each bank of magazines with an individual delivery deck or shelf disposed at a level different from that of the delivery deck of an adjacent bank of magazines. By this arrangement the dispensing mechanisms of adjacent magazines which are disposed in different rows or banks are not in the same horizontal plane with the result that if the decks are stepped back regularly and all of the dispensing devices reciprocate along parallel lines the magazines may be mounted in side-by-side reationship in each bank and each bank may be mounted immediately adjacent to a bank in front or behind it. The mounting of the dispensing means in different planes in accordance with a regular stepped back relationship will permit (unless otherwise controlled as by an interlock system) simultaneous actuation of all or any of the dispensing devices without interference between them or with the magazines.

Another object of this invention is to provide an improved dispensing device which will retain complete control of an article to be delivered until the moment of delivery. The actual dispensing instrumentality used in the embodiment of the invention hereinafter described comprises a flat member having a central opening corresponding generally to the configuration of the article to be dispensed and normally the lowermost article of a stack in a magazine is disposed within this central opening. When the dispensing instrumentality moves in its appointed direction, thereby pushing the lowermost article from the stack, a retaining shelf follows the dispensing instrumentality into the position which it formerly occupied and supports the remaining articles in the stack in the position that they occupied prior to the beginning of the delivery stroke. Applicant's dispensing device, in addition to providing a wall for performing the delivering function, provides a wall disposed opposite to the wall used for pushing the article from the stack for returning a partially dispensed article to the bottom of the stack when for some reason an external control is not fully actuated. This is an important function in a vending machine of the type which employs a free partial stroke coin mechanism positively coupled to all lever trains which in turn are coupled to the various dispensing devices. The free partial stroke permitted by some coin mechanisms constitutes, in conjunction with the external controls to which it is positively coupled, the means for returning an acceptable coin to a patron when, for example, a magazine is empty. Inasmuch as the dispensing devices are also positively coupled to the external controls, they may be partially actuated by partial actuation of the external controls. In order that such partial actuation of a dispensing device will not result in jamming of articles at the dispensing point or inadvertent delivery of articles, the dispensing device in this invention is adapted to return an undelivered article to its original position. In this invention two types of such dispensing devices are employed. One is rectangular in shape and the other has a C-configuration, and both have opposing walls at right angles to the axis of the stroke. The article to be dispensed lies between these walls with the result that either of these dispensing devices is capable of advancing an article to a point just short of delivery and then returning it to the bottom of the stack.

A still further object of the invention consists in the provision of an improved interlocking means operable to prevent actuation of more than a single push button or actuating lever upon deposit of a single coin in the machine. Thus, as disclosed herein, the lever trains extending between the push buttons or actuating levers and the dispensing devices are provided with a plurality of improved interlocks so disposed that only one lever train may be advanced into operating position at any one time, thereby making it impossible to actuate two trains at once, and additionally the machine is so constructed and arranged as to prevent sequential operation of a plurality of buttons or actuating levers upon deposit of a single coin only in the machine.

Another object of this invention is to provide an improved means for indicating to a customer that he has failed to actuate completely the push button or actuating lever, when such is indeed the fact, and that it is because of this incomplete actuation that the vending machine has not delivered merchandise. A feature of the invention which lends itself to the accomplishment of this object consists in the provision of means which will maintain the push button or actuating lever in a position of incomplete or partial actuation if a customer removes his hand from the button or lever before complete actuation has taken place. Thus, the customer will observe that the lever has not returned to normal position and will naturally complete the actuation until merchandise is finally delivered and the control is returned to its normal position.

Still a further object of the invention resides in the provision of an improved scavenger mechanism for detecting the presence of perforations in any coins, either genuine or spurious, that are deposited in the coin mechanism of the machine. Frequently washers, coins or other metallic rings having holes therein possess a surprising ability to pass the various tests imposed upon them by ordinary coin mechanisms, with the result that they all too often are accepted by the mechanism, thereby permitting actuation of the vending machine. However, in accordance with the present invention a scavenger is incorporated in the last position in the coin path of the coin mechanism before discharge into a coin till and is directly actuated by the lever trains which extend from the external push buttons or actuating levers to the dispensing mechanisms positioned within the cabinet, whereby a final examination of the coin takes place and if a perforation is present the coin is rejected and actuation of the vending machine is prevented.

A further object of this invention is to provide a positive means for disengaging a coin ejector in the coin mechanism from the lever which actuates it. The ejector referred to is one which exists for the purpose of returning an acceptable coin to a patron if for some reason the machine cannot deliver merchandise. Heretofore this ejector has been actuated by a lever which becomes disengaged by clearing a projecting portion affixed to the ejector structure. It has been found that the point at which the actuating lever clears this projection on the ejector varies as between coin mechanisms with the result that the length of the stroke of the ejectors is varied. A feature of this invention is the provision of a positive means for camming the actuating lever out of engagement with the ejector so as to definitely limit the length of the stroke of the ejector.

Other objects and features of the invention will become apparent from a reading of the following specification in the light of the accompanying drawings, in which:

Figure 1 is a front view of the vending machine with the door closed;

Figure 2 is a front view of the device with the door open;

Figure 3 is a view of the assembly comprising the storage magazines, the operable mechanism and the coin selector, the same having been withdrawn from the outer casing of the device;

Figure 4 is a plan view taken on the line 4—4 of Figure 3;

Figure 5 is a side view taken on the line 5—5 of Figure 4;

Figure 6 is a plan view taken on the line 6—6 of Figure 5;

Figure 7 is a plan view taken on the line 7—7 of Figure 5;

Figure 8 is a plan view taken on the line 8—8 of Figure 5;

Figure 9 is a side view taken on the line 9—9 of Figure 4;

Figure 10 is a view of the control mechanism taken from below;

Figure 11 is a side view of the coin selector mechanism taken on the line 11—11 of Figure 3;

Figure 12:
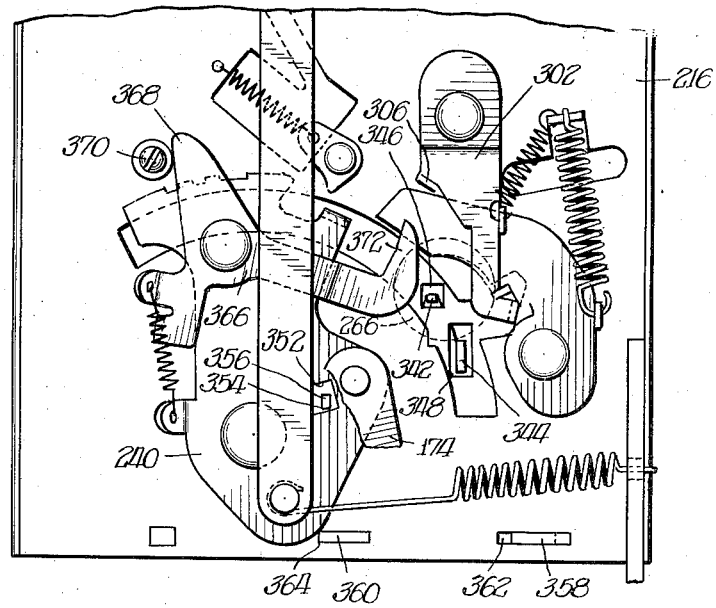
Figure 12 is a front view of a portion of the coin mechanism showing a washer scavenger.

Referring now to the drawings, it will be seen that the vending mechanism which is shown in elevation in Figure 3 comprises a separate unit which may be positioned in a cabinet 10 having a front door 12, shown in open position in Figure 2. When this door is closed the machine appears as in Figure 1 and presents a panel 14 in which may be disposed a mirror, advertising material or the like, a plurality of indicia carrying panels 16 in which may be mounted a specimen of each type of article which the machine will vend, and an opening 40 (which is identified in Figure 2 only) through which access may be had to the external controls or knobs 18 of the dispensing mechanism. In order that customers may not reach in through the opening 40 and tamper with the mechanism, a panel 20 with slits to permit actuation of the external controls 18 is positioned by means of a holding bar 22 and screws, such as 23. The numeral 24 identifies an outwardly sloping delivery chute which is positioned at the bottom of the cabinet 10 beneath the mechanism so that any article of merchandise dropped from the mechanism or any coin returned by the coin mechanism will drop upon it and will be directed toward the front of the machine where the customer may reach in and pick up the article or the coin.

This being a coin operated machine, a coin mechanism 30 is provided in permanent association with the coin mechanism, as may be seen in Figure 3. The coin chute of the coin mechanism is identified by the numeral 28 (Figure 2) and upon the closing of the door 12 this coin chute 28 registers with the slot 26 in the door 12. A return coin cup need not be provided in this machine because, as indicated in the preceding paragraph, there is positioned beneath the entire mechanism including the coin mechanism the delivery chute 24 which is utilized to return an unacceptable coin or an accepted coin when the machine for some reason will not deliver merchandise to the customer.

Completing the description of the cabinet, attention is invited to the top closure member 11 (Figure 2) which is hinged on the rear wall of the cabinet so that it may be raised upward when the front door 12 is open and provide a service man with quick access to the various magazines within the cabinet. In order to lock the machine, this top closure member 11 is dropped down and the door 12 is swung closed. The upper edge of the door 12 covers the front edge of the top closure member 11 so that the latter may not be opened. A lock 32 through the link 34 controls a bolt gang 36 which is disposed to engage on a locking motion the door jam members 38 on the cabinet. By this arrangement a single unlocking action will enable a service man to gain access to all magazines or to a coin box 342 into which is dropped the accepted coins from the coin mechanism 30.

*A plurality of banks or rows of storage magazines*

The first feature of this invention lies in the provision of a plurality of banks or rows of storage magazines which makes it possible to employ a cabinet narrower than would be necessary were a like number of magazines mounted in a single row in side-by-side relationship. In the embodiment shown in the drawings, this feature may be seen in Figure 4 which shows a plan view of five magazines, 42, 44, 46, 50 and 52. It will be noted that a front bank of magazines includes the magazines 50, 46 and 52 while a rear bank includes the magazines 42 and 44. The magazines 42, 44, and 46 are to be used for ordinary sticks of gum while the magazines 50 and 52 are for packages of gum pellets. By this arrangement of magazines in two banks it is possible to build a gum dispensing mechanism having a width slightly in excess of the length of two sticks of gum instead of a width in excess of three sticks of gum and two packages of gum pellets.

The structure for forming these five magazines comprises six metallic strips 54, 56, 58, 60, 62 and 64 vertically positioned and shaped to the various forms shown in cross-section in Figure 4. These strips are maintained in proper relationship by fastening the flanges 68 to a floor or deck 66.

It will be noted that the magazines in the front bank are spaced apart by spaces such as 70 and 72. As will appear hereinafter these spaces are utilized by certain levers controlling the dispensing elements for the magazines in the rear bank, but they perform the additional desirable function of permitting a service man to determine the contents of all of the magazines visually. Referring to Figure 2 wherein the door 12 is open, it will be seen that the gum pellets 316 and 318 may be seen at each side of the mechanism while the three stacks of conventional sticks of gum are visible between the stacks of pellets. This visibility is highly desirable in order to aid the service man in effecting a rapid loading of the machine. At this point attention is invited to the calibrations on the front faces of the magazines as may be seen in Figure 3. It will be noted that the calibrations for magazine 44 differ from those for the magazine 42 because the thickness of some types of wrapped gum differs from that of other types.

*A dispensing deck for each bank of magazines*

The second feature of this invention is that providing a plurality of decks for the dispensing devices, one deck for each bank, whereby the magazines of one bank may be mounted flush against the magazines of an adjacent bank. This avoids spacing the banks by a distance sufficient to prevent interference between the dispensing mechanisms. Before pointing out how this feature of the invention is attained in the embodiment shown in the drawings, certain collateral structure will first be described.

Referring to Figures 3 and 5, the principal supporting frame for the dispensing mechanism is the base 66 which is turned down at each side to form side walls 74 and 76. Fastened by any appropriate means to the side walls 74 and 76 are an upper deck 78 and a lower deck 80 which are maintained in properly spaced relationship by members, such as 82. Referring to Figures 4 and 5 it will be observed that the base 66 and the upper deck 78 are cut out in three places so as to permit articles such as packages of gum pellets 318 in the magazines in the front bank to pass therethrough to the delivery deck 80 which supports them. It will be observed in Figure 5 that the upper delivery deck 78 terminates at a point just short of the rear wall in the magazines such as 44 in the rear bank while the lower deck 80 terminates in a flange 84. The stacks of sticks of gum such as 344 are urged downwardly by a weight 322 and the stacks of gum pellets such as 318 by a weight 328.

As was indicated in the introductory portion of this specification, this invention utilizes a dispensing device which relies upon pushing one article off the bottom of the stack while holding the remaining articles in the stack until the return of the dispensing device to normal position. By way of example, referring to Figure 5, a link 96, which as may be seen in Figure 7 is flat so as to act as a supporting shelf when it passes beneath the stack of articles in the magazine, is rigidly fastened to a member having a C-configuration 90 (Figure 7). Similarly it will be noted that the dispensing device for the magazine 44 is a rectangular member 100 (see Figure 6) which is fastened to a link 104 which also has sufficient breadth to act as a supporting shelf for the articles in the magazine during the actuation of the dispensing device. On an actuating movement, which as viewed in Figure 5 would be toward the left, either dispensing device will commence the removal of a stick of gum from the bottom of the stack. The gum will not fall clear when its midpoint has passed beyond the edge of either of the delivery decks 80 or 78 because the other articles in the magazine will still be applying weight to that portion of the article which has not cleared the edge of the deck. The result is that the article must be pushed completely clear of the stack before it will drop from the delivery shelf. Moreover, it will be observed that the dispensing device 90 and the article moves to a point beneath the magazine 44 in the rear bank.

The inventive feature of this portion of applicant's invention lies in providing an open or unoccupied space beneath one magazine adjacent to the lower edge of another magazine into which space may move a dispensing device for the latter magazine. This is accomplished by disposing the dispensing devices for one bank of magazines at a level different from the level of the dispensing mechanisms of an adjacent bank. By this arrangement the dispensing operation of a magazine in one bank is completed at a point beneath a magazine in an adjacent bank. Expressed differently, a dispensing device of the general type employed in this vending machine requires a horizontal area for its complete functioning equal to approximately twice the area of the article which is dispensed. In order to avoid spacing magazines by a distance sufficient to provide this area, the dispensing means are stepped in such a fashion that the area below one dispensing device lying in normal or unactuated position may be used for the actuated portion of the stroke of another dispensing device. Thus, in Figure 5, the area beneath the dispensing device 100 and delivery deck 78 is utilized by the dispensing device 90 during the dispensing stroke of the latter. Similarly, if a third bank of magazines were placed behind the second, which in Figure 5 would be to the left of magazine 44, the dispensing devices for this bank would be at a third and higher delivery plane or deck, and the dispensing device 100 would utilize the space beneath an adjacent magazine in this third bank to perform the delivery portion of its stroke.

While the embodiment of this invention shown in the drawings employs a step arrangement in which the dispensing level for the front bank of magazines is lowermost, this arrangement, as contrasted with one which steps the dispensing devices of the various banks of magazines from one side to the other side or from back to front, is employed solely because of the positioning of the lever trains beneath the front portion of the dispensing mechanism, as may be seen in Figure 5. The use of other lever trains in a different position in the dispensing mechanism would make practical other arrangements for the stepped formation of the dispensing devices.

The dispensing devices

The dispensing devices have already been referred to and will now be specifically considered. Referring to Figure 7 there may be seen a rectangular dispensing device 88 and a C-shaped dispensing device 86. Considering the rectangular dispensing device 88 first it will be noted that it is fastened to a link 94 which is centrally disposed along the axis of the stroke of the dispensing device, which axis in Figure 7 is vertically disposed. When one actuates an external control of the dispensing machine mechanism such as the knob 18, the link 94 is advanced toward the rear of the mechanism and the front inside wall of the dispensing device 88 pushes one package off the bottom of the stack. Referring for a moment to Figure 5 it will be noted that the thickness of the rectangular dispensing member 100, like dispensing member 88, is approximately the same as the thickness of one of the packages of gum which it is designed to deliver.

As will more clearly appear in the descriptions of the coin mechanism, a free partial stroke of any external control such as the knob 18 is permitted in order to enable the coin mechanism to return an acceptable coin to a patron under certain circumstances. Inasmuch as there is no play between an external control, such as the knob 18, on the one hand and a dispensing device, such as 88, on the other, nor between this or any external control and the coin mechanism, it follows, that partial actuation of an external control will partially actuate its associated dispensing device. The latter will move an article part way from beneath the stack and then return to normal or unactuated position as the external control is returned to normal or unactuated position. If a dispensing device consisted only of a front wall for pushing an article of merchandise from the bottom of the stack, partial actuation of the dispensing device would leave an article of merchandise partially under the stack. The result of this might be a jamming of articles at the point of dispensing. For this reason one of the features of this machine is the provision of a back wall on each dispensing device which will cause the return of a packaged article lying within the dispensing instrumentality to the bottom of the stack in the event of any partial actuation thereof. The C-shaped dispensing devices, such as 90, or the rectangular devices, such as 100, perform this function equally well.

The lever trains connecting the external controls to the dispensing devices

Between each dispensing device and a corresponding external control is a lever train. As all five of these are identical in principle, varying in unimportant details of structure to meet individual circumstances, only one lever train will be described.

The figures most useful in observing a lever train are Figures 4, 5, 9 and 10. In Figure 9, an external control 114 carrying the knob 18 for manual operation is pivoted on a shaft 116 and extends beyond the shaft as a bracket 118. Also mounted on the shaft 116 is a lever 120 spaced from the lever 114 by a sleeve 122 and held in assembled relationship by clips 124 and 126. The lever 120, like 114, carries a bracket 128 positioned adjacent to bracket 118 and so held by pressure exerted by ends 130 and 132 of a spring 134. The lever 120 carries a slot 136 which engages a lug 138 of a lever 142 pivoted loosely on a shaft 144. The lever 142 carries a slot 146 in which may move a lug 148 mounted on an arm 150 rigidly affixed to the shaft 144. As may be seen in Figure 10, the lug 148 extends beyond the surface of the lever 142 whereby it will intercept the path of a pawl 152 pivoted at 154 on the lever 142. A lug 156 prevents the pawl 152 from working out of position. The lever 142 carries a second lug 158 which is adapted to engage a slot 160 cut into the bracket 110 of the link 102. The construction may be best perceived by looking at Figure 6 where the link 102 is perceived to be a flat piece of metal resting on the deck 78 which with deck 80 forms part of the frame of the dispensing mechanism. The rectangular dispensing member 98 is permanently fastened to the inner end of link 102 at points such as 162.

Returning to Figure 9, a spring 164 is anchored to the lug 138 and to a fixed point on a channel piece 166 and assures maintenance of the lever 114, in the normal position shown in Figure 9, regardless of what position the lug 148 may take in the slot 146. The channel piece 166 carries a flange 168 which holds the pawl 152 in the position shown in Figure 9, that is, clearing the lug 148 when the lever 114 is in normal position. A strong spring 170 is mounted between the shafts 116 and 144 for the purpose of maintaining the shaft 144 in the normal position shown in Figure 9, not only in resistance to pressure from a lever arm such as 114, but from any resistance which might arise in the coin control mechanism to which the shaft 144 is positively connected by links 172 and 174 coupled at 176.

The remaining lever trains are very much like the one described above. Among the differences is the fact that in order to have the knobs such as 18 centrally positioned, it is necessary to offset the lever arms such as 114 in different ways, thereby causing an arm such as 118 to be turned in one direction in one case, and in the opposite direction in another. Attention is invited, also, to the fact that the delivery devices 98 and 100 for the rear bank of magazines are coupled to their respective lever trains at a level different from that for the other three delivery devices. It will be noted in Figure 6 that the link 102 passes between the magazines 46 and 50. The lever train for dispensing wrapped pellets in magazine 50 terminates in a link 92 carrying dispensing means 86 as may be seen in Figure 9. This particular bank may be more clearly seen in Figure 5 where the rectangular dispensing means 90 is fastened to the link 96 which carries a bracket 178 properly slotted to carry the actuating lug of the lever train.

Describing one stroke of the lever 114, downward pressure upon the lever 114 causes the lever 120 to move counterclockwise, thereby engaging the lug 138 of the lever 142 which moves in a clockwise direction. The lever 142 causes clockwise movement of the lug 148 and the arm 150 which similarly actuates the shaft 144. As the lever 142 moves clockwise, the pawl 152 is dropped downward as it moves away from the bracket 168 so that the edge 212 engages the lug 148 and prevents any change of relationship between the arm 150 and the lever 142. The lug 158 advances the bracket 110 and the link 102 to the right which causes the rectangular dispensing device 98 to remove one stick of gum from the bottom of the magazine 42. The stick of gum drops downwardly as soon as it clears the deck 78. During the operation of this lever train, it will be noted that all arms corresponding to the arm 150 on the shaft 144 were actuated, but did not affect any part of associated lever trains because in each instance the lug corresponding to lug 148 moved idly in a slot corresponding to 146. In a lever train where this occurred, the spring corresponding to spring 164 held the particular lever train in normal position.

Attention is invited at this time to Figure 10 which brings out the compactness and precision of the structure which enables a single coin mechanism to control any one of the five manual control levers 114. As may be seen in this figure, each of the control levers such as 114 will actuate the shaft 144, but will not actuate the shaft 116, and hence, will communicate no motion to any other lever such as 114. The shaft 144 is coupled to the link 174 of the coin control mechanism 30 which is of the partial stroke type as will appear more clearly hereinafter. The link 174, being positively coupled to the shaft 144, will control its movements and thereby will control the movement of any lever such as 114.

The interlock

In order to prevent the simultaneous actuation of more than one lever, such as 114, the machine is provided with an interlock which may be seen in Figure 8. This interlock generally referred to by the numeral 180 may be seen in Figure 8 and comprises a plurality of flat, irregularly spaced pieces of metal which in the art are commonly referred to as interlock bolts, resting upon an offset portion 182 of the channel piece 166 (see Figure 9) and upon a plate 184 fastened to a plate 186 which is turn is fastened to the deck 80. As may be seen in Figure 8, the plate 186 has a plurality of cut out portions as 188 into which is inserted a nib 190 attached to an interlock bolt such as 192. The total width of the interlock bolts between the points 194 and 196 is less than the distance between the brackets 198 and 200 by the width of one such bracket. It will be seen that each bracket, such as 198, 110, 200, 202 and 204 is adapted to be advanced between the walls of two adjacent interlocking members, such as 192. The actuation of a lever train such as that commencing with the knob 18 and the lever 114 will cause the bracket 110 to spread the bolts 192 and 206 by the thickness of the bracket 110. This will bring the bolt 208 into engagement with the bracket 198 at a point 194 and a bolt 210 into engagement with the bracket 200 at 196. It is apparent that when any one bracket has spread the interlock, no other bracket can be advanced. This construction prevents the actuation of more than one lever train at a time.

The coin mechanism

Further features of this invention arise in conjunction with the coin mechanism which may be seen in Figures 3, 11, 12 and 13. Referring to Figure 11, the coin mechanism comprises a plate 216 from which depends a scavenger 218 swung from points 220 and 222 and held loosely against the plate 216 by a spring 224. The front edge of the scavenger 218 carries a coin chute 28.

In use, if a coin is of a size which will pass through the coin slot 26, it will descend the coin chute 28 and strike an anvil 234 which will cause it to rebound over an obstacle 236 if the coin has a proper resiliency. It will be noted that the speed of fall of the coin as it hits the anvil will always be approximately the same as it falls the same distance and it is impossible to give the coin additional speed because of the curvature of the upper portion of the coin chute 28. If the coin does not bound properly from the anvil 234, it will stop in the position indicated by the numeral 238. It will be observed that actuation of the link 174 through the lever 240 will cause a slight downward movement of a link 242 which in turn, see Figure 3, through an arm 244 will rock the scavenger 218 outwardly into the position indicated by the numeral 230. As the scavenger moves outwardly, the side wall support for the penny lying at the point 238 is withdrawn and the penny topples sidewardly and downwardly against the chute 232 and is returned to the customer.

If, however, the coin properly bounds from the anvil 234, it passes across the face of a magnet 246. In the event that the coin possesses magnetic properties, it will stop in some such position as that indicated by the numeral 248. An offset member 250 is attached to the scavenger in such a way that the coin lies between the scavenger 218 on the one side and the flange 250, the magnet 246 and the wall 216 on the other. If the coin is held by the magnet 246, the moment the link 174 is actuated by any appreciable amount, the scavenger 218 is moved toward the position 230 shown in Figure 3 whereby the offset member 250 moves the coin to the right and clears it of the magnet 246 so that it falls downward to the chute 232 and is returned to the patron.

If the coin is of proper size, possesses the proper rebound properties and is not magnetic, it passes onto a scale 252 pivoted at 254 and having a weighing platform 256. A counterbalance 258 of the scale carries an adjustable weight 260 which permits alteration of the balance until the scale will pass the particular coin which for this use is an ordinary penny. The penny passes to a point such as 262 and if it is light, it will not overcome the counterweight 258, but will roll forward and drop downwardly upon the chute 232, thereby being returned to the customer. If the coin has the proper weight, the weighing platform 256 will then tip downwardly and the coin will pass down a track indicated by the dotted lines 264 and occupy the position shown by the numeral 266.

An acceptable coin has now reached that point in the coin mechanism whereby it will permit actuation of the vending mechanism. The coin is able to do this, because it is so positioned in a track that it will act as a necessary link in a train. If it is not there, the link being missing, the train cannot advance; if it is there, the train can advance. The position which the coin now occupies, indicated by the numeral 266, is maintained by virtue of a lower wall 268 of the coin track and an angular projection 270 on a lever 272 pivoted at 274 on the coin selector wall 216. The angular projection 270, the coin at 266 and an angular projection 276 on the lever 240 are all in the same vertical plane, while a tip 278 of the lever 272 is in the same plane as a forward edge 280 of the lever 240. Downward movement of the link 174 causes clockwise actuation of the lever 240, and it will be perceived that the forward edge of the angular projection 276 of the lever 240 will engage the penny in the position 266 before the forward edge 280 of the lever 240 engages the edge 278 of the lever 272. This being the case, the angular projection 276 causes the penny to force the angular projection 270 and the lever 272 in a clockwise motion against the pull of the spring 282. In so doing, the tip 278 is raised and the forward edge 280 passes beneath it.

In order to make certain that the coin is driven completely through the track, a series of teeth 284, 286 and 288 are provided in the upper edge of the lever 240 which engage a full stroke pawl 290 suitably sprung. If the link 174 is brought downward only far enough to bring the pawl into engagement with the tooth 288, a spring 292 will not be able to return the lever 240 to the normal position shown in Figure 11. It is necessary that the lever 240 make a complete stroke and pass to the right of the full stroke pawl 290, in which case a rear edge 294 of the lever 240 on the return stroke rolls the full stroke pawl 290 clockwise for about 90° out of engagement with the teeth, thereby permitting the lever 240 to return to normal position. A spring 296 will cause the pawl 290 to assume the position shown when the forward edge 280 has cleared the pawl.

It is important that in the event that the machine will not deliver a package for some reason, as for example, exhaustion of the magazine, that the penny which has reached the point 266 be returned. This is accomplished by a pair of levers, namely, 298 pivoted on the lever 240 at 300, and an ejector 302 pivoted on the wall 216 of the coin mechanism at 304. The ejector 302 carries an offset portion 306 which lies in the vertical plane of the hook 308 affixed to the lever 298. At the lower end of the ejector 302 is a second offset portion 310 which lies in the coin track and upon actuation of the ejector 302 in a clockwise direction will engage the penny at 266. Attention is called to the fact that the penny at 266 rests upon the wall 268 and the angular projection 270 in the coin track. If a penny is moved to a position to the left of the wall 268, it will immediately drop into the chute 232 and be returned to the patron. The orifice of the coin return chute may be seen in Figure 5 and is identified by the numeral 312. The lever 240 is maintained in normal position which is that shown in Figure 11 by means of a spring 314. The hook 308 presses against the offset portion 306.

Attention is again invited to the full stroke pawl 290 which in conjunction with the notches 284, 286 and 288 on the lever 240 will hold through the links 174 and 172 the shaft 144 to which each external control is locked. If an external control is sufficiently actuated so that the full stroke pawl 290 engages the first notch 288, the external control cannot be returned to normal but will remain in partially actuated position. Should a customer stop the stroke at this point he will note that the external control does not return to its original position and will attribute to this condition of the lever the fact that the machine has not delivered merchandise. This cooperation between the coin mechanism and each external control saves the machine from considerable abuse.

Figure 13:
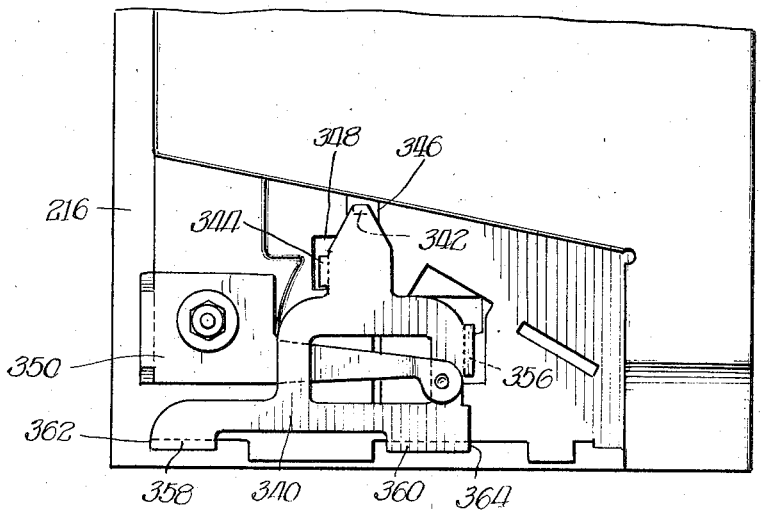
Figure 13 is a rear view of that portion of the coin mechanism shown in Figure 12.

In Figures 12 and 13 may be seen a coin mechanism employing two improvements over the structure shown in Figure 11. The first feature of this coin mechanism is the employment of a scavenger generally identified by the numeral 340 for removing tokens or coins containing holes, particularly washers, which have succeeded in reaching the accepted position 266. This scavenger comprises a plate having two fingers 342 and 344 which slip into the holes 346 and 348 of the plate 216. The scavenger 340 is held in assembled relationship by a spring member 350 which performs the additional function of pressing the scavenger 340 against the plate 216, and of holding it in assembled relationship with the coin mechanism. Attention is invited to the lever 240 which has been punched at 352 to receive the end 354 of a bracket 356 having a cam edge attached to the scavenger 340. Upon actuation of the lever 240 in a clockwise direction, the cam edge of the bracket 356 permits the spring 350 to rock the scavenger 340 toward the plate 216, using brackets 358 and 360 loosely seated in holes 362 and 364 as a pivoted point. As this occurs, the testing finger 342, which is disposed in registry with a hole 346 advances inwardly and encounters any coin in the accepted position 266. If the coin in the position 266 does not have a hole in it, the testing finger 342 merely slides along its surface as the lever 240 advances and drives the coin downwardly in the direction of the coin till. If, however, there is a hole in the coin, the testing fingers 342 and 344 cooperate to prevent further actuation of the lever 240. When this occurs, the patron can no longer advance the external control lever and he permits it to return to normal. As he does this, the scavenger 340 with the testing fingers 342 and 344 withdraw from the coin track and the lever 366 flicks the ejector 302 which returns the slug to the patron. It will be noted that the scavenger 340 is cammed out of the coin track by means of the punched hole 352 in the lever 240 just before the ejector 302 engages the washer. By this timing, the finger 342 does not interfere with the ejection of the washer from the coin track by the ejector 302.

A second feature employed on this improved coin mechanism was aimed to secure more positive actuation of the ejector 302. In this structure the lever 366 has been substituted for the lever 298 of the structure shown in Figure 11. It will be noted that this lever has a camming projection 368 adapted to engage a lug 370 fastened to the principal wall 216 of the coin mechanism. As the lever 240 moves in a clockwise direction, the hook 372 of the lever 366 engages the projection 306 of the ejector 302. As the lever 240 returns to normal position in a counter-clockwise movement, the hook 372 actuates the ejector up to a certain point and is then cammed out of engagement with the projection 306 because the camming projection 368 engages the lug 370. This arrangement shortens the stroke of the ejector 302.

The principal features of this machine have now been described, but a few additional features should be mentioned. In Figure 2 are shown stacks of stick gum as 48 and stacks of wrapped pellets as 316 and 318. A weight is placed above each stack, such as 320, 322, 324, 326 and 328, see Figure 1. As a magazine is exhausted, the weight descends, and being of the same size as the gum, will ultimately rest upon the delivery floor such as the deck 78 beneath the rear bank of magazines as 42. When the last stick of gum in a magazine has been dispensed by its dispensing means, such as 100, see Figure 6, the weight such as 322 rests on the deck 78 and being of a thickness many times that of a stick of gum, cannot be dispensed. It will be noted that the side flange 330 of the weight 322 has a depth equal to that of the width of the gum and the inside depth dimension of the magazine, while the width of the magazine 44 equals the width of the inside dimension of the magazine and the length of the stick of gum. But as may be seen in Figure 4, the bottom of the weight is cut back at 332 and carries a forward lug 334, which, as may be seen in Figure 6, engages a forward lug 336 on the arm 104. Referring to the magazine 44 in Figure 4 in which the weight 322 is shown resting on the deck 78, there is a space 338 between the lugs 334 and 336 which may be taken up by the actuation of the arm 104 before the weight 322 jams against the wall of the arm 104.

As will more clearly appear in the description of the portion of this machine which follows, the space 338 is important in that it permits partial actuation of the lever train controlling the particular magazine, and this partial actuation flicks the ejector 302 thereby causing the return of a coin in position 266 to the patron.

Another feature of this machine is the coin till 342 which comprises a removable container which may be readily inserted from the front into the position shown in Figure 2.

It will be observed that the sloping chute 24, which is affixed to the bottom of the container, is utilized both for the purpose of delivering gum to the patron and for returning a coin not accepted by the coin control mechanism.

*Operation*

The operation of the machine as a whole will now be described. A patron approaches the machine which presents the appearance shown in Figure 1. Each indicia carrying panel will show a wrapped gum of the kind contained by the corresponding gum magazine. It may be desirable to replace the indicia carrying panels with a window or windows which would permit the patron to see each magazine of gum or other packaged article.

The first step in describing the operation of the machine will proceed under the conditions that the customer has not deposited a proper coin in the coin mechanism and that each magazine in the machine contains a supply of gum. The customer, after inserting a slug or after failing to insert any coin in the coin mechanism 30, selects and presses down the knob 16. As the lever 114 descends (Figure 9), the edge 212 of the pawl 152 drops against the lug 148 and holds the arm 150 and the lever 142 in fixed relationship. This dropping of the pawl 152 occurs during the first part of the downward movement of the lever 114. As the lever 114 continues to descend, it actuates the bracket 110, the arm 102 and the dispensing device 98, which commences to move a stick of gum off the bottom of the stack in the magazine 42. While this is occurring, the shaft 144 is being rotated, and as viewed in Figure 11, this rotation is in a counter-clockwise direction which through the links 172 and 174 causes the lever 240 to move in a clockwise direction as viewed in Figure 11, There being no coin in the position 266, the angular projection 276 advances without interference in the coin track, but the forward edge 280 of the lever 240 encounters the point 278 of the lever 272. When this occurs, the lever 240 can no longer be advanced and through the links 172 and 174 stops further rotation of the shaft 144.

Returning for the moment to Figures 9 and 10, it is evident that the arm 150 positively fastened to the shaft 144 through the lug 148 will not permit further actuation of the lever 142 or the lever 114. If, however, the customer thinks that by sheer force he can push the lever 114 home and thereby cause a stick of gum to be dispensed, he can continue to push the lever 114 downward, in which event the strong spring 134 will take up the load, for the brackets 118 and 128 will spread the spring tips 130 and 132 apart against the pressure of the spring 134. This arrangement goes far in preventing damage to the machine.

On this initial stroke which was ultimately stopped by the coin mechanism, three other movements occurred which should be noted. Firstly, as may be seen in Figure 8, the bracket 110 spread the adjacent interlock bolts 192 and 206 immediately after the stroke of the lever 114 had commenced, and in so doing, made it impossible for the patron to actuate any other lever on the machine. The second and third movements to be noted relate to the coin mechanism. As may be seen in Figure 11, the slightest stroke of the lever 240 causes the link 242 to rock the scavenger 218, and should there have been an unsuitable coin delayed in the coin track, it will have been dropped. The third movement is that of the hook 308 which passes behind the offset portion 306 of the ejector 302 before the interfering forward edge 280 engages the blocking edge 278. The result is that when the patron released the partially actuated lever 114, the springs 170 and 292 caused the lever 240 to return to normal position, and in so doing, the hook 308 flicked the offset portions 306 and 310 of the ejector 302. This is the structure which gives the characterizing name "free partial stroke" to this type of coin mechanism. Attention is invited to the fact that the pawl 290 did not engage the first notch as 288 on the lever 240 when the forward edge 280 engaged the blocking edge 278. Because of this, the lever 240 is free to return to normal position.

When the customer realizes that the machine will not deliver an article without inserting a proper coin in the coin slot 26, he may now insert such a coin. As explained before, if the coin is defective, it will be returned to the customer before it reaches the position 266. If it reaches the position 266, a lever such as 114 will be released for further actuation, because the angular projection 276 of the lever 240 in the coin mechanism will engage the coin at position 266 which in turn engages the angular projection 270 of the lever 272 and raises blocking edge 278 out of alignment with the forward edge 280. There now being no resistance to further movement of the lever 240, the patron may continue to move the lever 114 downward without expanding spring 134 (see Figure 10). Immediately after the angular projection 276 engages a coin in position 266, and pawl 290 encounters the first notch 288 on the lever 240, should the patron stop pushing down the lever 114 at this point, the full stroke pawl 290 engaging the teeth 284, 286 and 288, will prevent the springs 170 and 292 from returning the lever 114 and the knob 18 to normal position. The full stroke pawl 290 and teeth 284, 286 and 288 are so positioned that the gum will not drop from a magazine until the pawl clears the edge 294 of the lever 240.

The final condition that the machine must meet arises when a magazine is exhausted and the customer, after depositing an acceptable coin, presses down on the lever controlling that magazine and receives no gum. Under such circumstances, if the machine is to be preserved from abuse and if the good will of the machine is to be retained, it is essential that the coin be returned. This is accomplished by means of the offset portion 310 on the ejector 302 of the coin selector mechanism shown in Figure 11 in conjunction with the shape of the bottom of the weight 322, shown in Figures 4 and 5. Assuming that the weight 322, see Figure 5, has dropped into the position occupied by the stick of gum 344, it will be seen that the delivering wall 342 of the dispensing device 100 may be advanced a considerable distance before engaging the weight 322.

If the bottom of the weight 322 were the same size as the stick of gum 344, the dispensing means 100 could be advanced no appreciable distance, which would block any actuation of the lever 340 and of the shaft 144. The result of this would be that the hook 308 on the lever 298, see Figure 11, would not flick the offset portion 306 on the ejector 302 so that no jiggling of the external control 18 would remove a coin from the position 266. The coin would not be shunted over the wall 268 into the return chute 232 and 312, nor could it be forced downwardly along the coin track. It is, therefore, essential that the hook 308 be able to engage the offset portion 306 of the ejector 302, when there is no longer any merchandise in the magazine. It is also necessary that the distance 338 between the lugs 334 and 336, see Figure 4, be sufficiently great to permit a partial stroke of the lever trains so that the hook 308 will engage the offset portion 306 of the ejector 302, but not great enough to permit the offset portion 276 to force a coin in position 266 further along the coin track.

It is, therefore, an effect of this construction that a customer may deposit a coin and press down an external control 18 and its lever 114 sufficiently far to engage the hook 308 with the offset portion 306 and then release the lever 114, which will cause the ejector 308 to return his coin even though the associated magazine is loaded with merchandise. However, he cannot get both merchandise and the return of his coin, for if he presses the lever far enough to cause the angular projection 276 to engage the coin, he has moved the lever 240 sufficiently far to cause the full stroke pawl 290 to engage the tooth 288. When this point is reached, neither the machine itself by the springs 170 or the spring 292 or the patron can pull back to normal the lever 114. The lever must be fully actuated in order to return the machine to normal position. The coin will not be returned under any circumstances.

In the machine shown, the gum will not drop off the deck 78, see Figure 5, from the magazine 44 until after the lever 240, see Figure 11, has been rotated clockwise to a point where the full stroke pawl 290 has cleared the edge 294 of the lever 240.

It is apparent that other structures may be devised which do not depart from the principle of the multiple bank of magazines for merchandise or from the principle of dispensing merchandise from each bank at a level different from that of any other bank. It will be noted that applicant's structure constitutes the utilization of a plurality of decks set back from the rear to the front and from the top to the bottom, whereby the rear bank of magazines will be emptied at a level above the front level. It is possible to reverse this arrangmenet of decks and provide means for drawing off the front bank of magazines from the upper level and the rear bank from the lower level. Equivalents for other features of this invention may be devised.

Having thus described our invention, what we claim as new and desire to secure by Letters Patent of the United States is:

1. In a machine of the character described, in combination, a front bank of storage magazines with spaces therebetween disposed substantially parallel to the front side of the machine, a second bank of storage magazines disposed behind the front bank, a dispensing device for each storage magazine, a plurality of external controls disposed along one side of the machine, one external control for each dispensing device, actuating means connecting certain external controls to the dispensing devices of storage magazines in the front bank, and other actuating means disposed in the spaces between the magazines in the front bank and connecting other external controls to the dispensing devices of storage magazines in the second bank.

2. In a machine of the character described, in combination, a front bank of storage magazines with spaces therebetween disposed substantially parallel to the front side of the machine, a second bank of storage magazines disposed behind the front bank and having its magazines in staggered relationship with respect to those in the front bank, a dispensing device for each storage magazine, a plurality of external controls disposed along one side of the machine, one external control for each dispensing device, a separate actuating means connecting certain external controls to the dispensing devices of the storage magazines in the front bank, and other separate actuating means disposed in the spaces between the magazines in the front bank and connecting other external controls to the dispensing devices of the staggered storage magazines in the second bank.

3. In a machine of the character described, in combination, a front bank of storage magazines disposed substantially parallel to the front side of the machine, a positive dispensing device associated with the base of each storage magazine, all of the positive dispensing devices of the front bank of storage magazines being at a common level, a second bank of storage magazines disposed behind and substantially parallel to the front bank of storage magazines, a positive dispensing device associated with the base of each of these storage magazines in the second bank, all of the dispensing devices of the second bank of storage magazines being at a common level different from the level of the dispensing devices for the front bank of storage magazines, and a separate external control with a separate actuating means associated with each dispensing device, all of said external controls being disposed along one side of said machine, whereby the front bank of storage magazines may be closely positioned to the second bank of storage magazines without causing interference between the two levels of positive dispensing devices during their actuation.

4. In a machine of the character described, in combination, a front bank of storage magazines disposed substantially parallel to the front side of the machine, a delivery deck disposed beneath said magazines, a positive dispensing device for each storage magazine on the front bank utilizing said delivery deck, a second bank of storage magazines disposed behind the front bank, a second delivery deck at a different level than the first delivery deck disposed beneath the magazines in the second bank, a positive dispensing device for each storage magazine in the second bank utilizing said second named delivery deck, and a separate external control with a separate actuating means associated with each dispensing device, whereby the front bank of storage magazines may be closely positioned to the second bank of storage magazines without causing interference between the dispensing devices on the two decks during their actuation.

5. In a machine of the character described, in combination, a plurality of banks of storage magazines, said banks being in side by side relationship, a delivery deck for each bank, each delivery deck lying in a plane different from the plane of the delivery deck of an adjacent bank of storage magazines, a dispensing device for each storage magazine, and an external control coupled to each dispensing device for actuation thereof whereby the storage magazines may be closely positioned without causing interference between the various dispensing devices during actuation.

6. In a machine of the character described, in combination, a plurality of banks of storage magazines disposed in substantially parallel relationship, the magazines of any one bank being staggered in relation to the magazines of any other bank, a dispensing device associated with each storage magazine, a separate delivery deck for each bank of magazines, each delivery deck lying in a plane different from the plane of the delivery deck of an adjacent bank of storage magazines, an external control for each storage magazine, and coupling means connecting each external control to the dispensing device of its storage magazine, whereby the banks of storage magazines may be positioned closely together without causing interference during actuation of the dispensing devices.

7. In a machine of the character described, in combination, a plurality of banks of storage magazines disposed in substantially parallel relationship with the magazines of one bank staggered in relationship to the magazines of an adjacent bank, a dispensing device for each storage magazine, a delivery deck for each bank of magazines, each delivery deck lying in a plane different from the plane of the delivery deck of an adjacent bank of storage magazines, an external control for each storage magazine, coupling means connecting each external control means to the dispensing device of its storage magazine, whereby the banks of storage magazines may be positioned closely together without causing interference during actuation of the dispensing devices, and means for normally maintaining the external controls in alignment with one another.

8. In a machine of the character described, in combination, a plurality of banks of storage magazines disposed in substantially parallel relationship with the magazines of one bank staggered in relationship to the magazines of an adjacent bank, a dispensing device for each storage magazine, a delivery deck for each bank of magazines, each delivery deck lying in a plane different from the plane of the delivery deck of an adjacent bank of storage magazines, an external control for each storage magazine, coupling means connecting each external control to the dispensing device of its storage magazine, whereby the banks of storage magazines may be positioned closely together without causing interference during actuation of the dispensing devices, and means for causing the external controls to move through identical arcs during separate actuation thereof.

9. In a machine of the character described, in combination, a plurality of external controls disposed along one side of the machine, a pair of banks of storage magazines, a dispensing device for each storage magazine mounted at the base thereof, coupling means extending between each external control and the dispensing device of its respective storage magazine, and a delivery deck beneath the dispensing devices of the storage magazines of each bank, each of said delivery decks terminating at the rear edge of the storage magazines in its particular bank, and one deck lying in a different plane from the other deck, the deck for the front magazine being the lowest and the deck for the next succeeding bank of magazines being a step higher, whereby a dispensing device may remove an article of merchandise from the bottom of a stack of articles in a storage magazine and push it off the supporting deck without interference with other magazines or other dispensing devices and permit the dispensed article to drop into a delivery chute.

10. In a machine of the character described, an upper deck, aligned openings in said deck, a lower deck disposed beneath the openings in the upper deck, a vertical storage magazine disposed above said openings in the upper deck, other storage magazines disposed adjacent to and above the aligned openings and at an edge of the upper deck, a dispensing device for pushing the bottom article of stacked merchandise from the upper deck associated with each of the latter named storage magazines, a similar dispensing device beneath each of the first named magazines and disposed on the lower deck, and an external control operably connected to each dispensing device.

11. A machine of the character described, in combination, a substantially rectangular upper delivery deck, vertical storage magazines for holding a stack of articles supported by said deck disposed above and along one side of said deck, a dispensing means of the type adapted to push an article off the bottom of a stack disposed between the bottom of each of said storage magazines and said deck, aligned holes in said deck adjacent to the bottoms of said magazines and in staggered relationship thereto, a lower deck disposed beneath said aligned holes, a vertically disposed storage magazine in each of said aligned holes, a dispensing mechanism of the type adapted to push an article off the bottom of a stack disposed between the bottom of said latter named storage magazine and the lower deck, and an external control linked to each dispensing means.

12. A machine of the character described, in combination, a substantially rectangular upper delivery deck, vertical storage magazines for holding a stack of articles supported by said deck disposed above and along one side of said deck, a dispensing means of the type adapted to push an article off the bottom of a stack disposed between the bottom of each of said storage magazines and said deck, an actuating link connected to each dispensing device and resting on said deck, aligned holes in said deck on opposite sides of said links, a lower deck disposed beneath said aligned holes, a dispensing device of the type adapted to push an article off the bottom of a stack resting on the lower deck in alignment with each hole, a storage magazine disposed in each hole, and an external control operably connected to each dispensing device.

13. A machine of the character described comprising, in combination, a front bank of substantially vertical storage magazines, a dispensing device associated with the base of each storage magazine, a second bank of substantially vertical storage magazines substantially parallel to and closely positioned to the first bank of storage magazines, a dispensing device associated with the base of each storage magazine in the second bank, the dispensing devices associated with the second bank of storage magazines being characterized by the fact that each such dispensing device is at a level different from the dispensing device associated with an adjacent magazine in the front bank of storage magazines, and an external control operably connected with each dispensing device.

WILLIAM P. GALLAGHER.
ERNEST H. THOMPSON.